US008270972B2

(12) United States Patent
Otting et al.

(10) Patent No.: US 8,270,972 B2
(45) Date of Patent: Sep. 18, 2012

(54) METHOD AND APPARATUS FOR DETECTING AN ALTERNATE WIRELESS COMMUNICATION NETWORK

(75) Inventors: Marcia J. Otting, Vernon Hills, IL (US); Timothy M. Burke, Norton, MA (US); Robert F. D'Avello, Lake Zurich, IL (US); Phillip D. Rasky, Buffalo Grove, IL (US); James E. Mathis, III, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1150 days.

(21) Appl. No.: 11/877,073

(22) Filed: Oct. 23, 2007

(65) Prior Publication Data
US 2009/0104907 A1 Apr. 23, 2009

(51) Int. Cl.
*H04W 4/00* (2009.01)
(52) U.S. Cl. .................. 455/435.2; 455/435.3; 455/436; 455/432.1; 455/432.3; 455/435.1
(58) Field of Classification Search .............. 455/432.1, 455/433–440, 456.1–456.2, 517, 525, 435.2, 455/435.3, 432.2, 432.3
See application file for complete search history.

(56) References Cited

U.S. PATENT DOCUMENTS

| 6,088,587 | A | 7/2000 | Abbadessa | |
|---|---|---|---|---|
| 6,829,481 | B2 | 12/2004 | Souissi | |
| 7,171,203 | B2* | 1/2007 | Buckley | 455/435.2 |
| 7,907,559 | B2* | 3/2011 | Fodor et al. | 370/328 |
| 2001/0036827 | A1* | 11/2001 | Edlund et al. | 455/432 |
| 2004/0009751 | A1* | 1/2004 | Michaelis et al. | 455/62 |
| 2004/0076130 | A1 | 4/2004 | Uchida et al. | |
| 2004/0121781 | A1* | 6/2004 | Sammarco | 455/456.1 |
| 2005/0037757 | A1 | 2/2005 | Moon et al. | |
| 2005/0059397 | A1* | 3/2005 | Zhao | 455/435.2 |
| 2005/0078644 | A1 | 4/2005 | Tsai et al. | |
| 2005/0136898 | A1* | 6/2005 | Shaheen et al. | 455/414.1 |
| 2005/0237963 | A1 | 10/2005 | Storm | |
| 2006/0172737 | A1* | 8/2006 | Hind et al. | 455/435.2 |
| 2006/0227744 | A1 | 10/2006 | Metke et al. | |
| 2006/0246899 | A1* | 11/2006 | Buckley et al. | 455/435.2 |
| 2007/0004404 | A1* | 1/2007 | Buckley et al. | 455/434 |
| 2007/0058679 | A1* | 3/2007 | Pelletier et al. | 370/477 |
| 2007/0202875 | A1* | 8/2007 | Dorsey et al. | 455/434 |

(Continued)

FOREIGN PATENT DOCUMENTS
EP 1545146 A 6/2005
(Continued)

*Primary Examiner* — Kamran Afshar
*Assistant Examiner* — Mong-Thuy Tran
(74) *Attorney, Agent, or Firm* — Sylvia Chen (57) ABSTRACT

A method for selecting an alternate wireless communication system for a wireless communication device is disclosed. The method comprises using a first radio access technology (RAT) by a wireless communication device when scanning (202) for an initial wireless communication network (201). The wireless communication device further registers (215) to the initial wireless communication network (201). Then, the initial wireless communication network (201) determines (206) alternate RAT wireless communication network information for the wireless communication device and sends (235) the alternate RAT wireless communication network information to the wireless communication device. The wireless communication device receives the alternate RAT wireless communication network information and selects (240) a first alternate wireless communication network from within the alternate RAT wireless communication network information, scans for the first alternate wireless communication network using an alternate RAT and registers with the first alternate wireless communication network using the alternate RAT.

23 Claims, 5 Drawing Sheets

U.S. PATENT DOCUMENTS

| | | | |
|---|---|---|---|
| 2007/0207815 A1* | 9/2007 | Alfano et al. | 455/456.1 |
| 2007/0211624 A1* | 9/2007 | Schmidt et al. | 370/225 |
| 2007/0224988 A1* | 9/2007 | Shaheen | 455/436 |
| 2007/0270135 A1* | 11/2007 | Gaschler | 455/414.3 |
| 2008/0020792 A1* | 1/2008 | Falk et al. | 455/517 |
| 2008/0176565 A1* | 7/2008 | Eerolainen et al. | 455/436 |
| 2008/0182615 A1* | 7/2008 | Xue et al. | 455/552.1 |
| 2008/0311912 A1* | 12/2008 | Balasubramanian et al. | 455/436 |
| 2009/0005041 A1* | 1/2009 | Steinberg et al. | 455/435.2 |
| 2009/0023446 A1* | 1/2009 | Das | 455/435.2 |
| 2010/0022243 A1* | 1/2010 | Oommen et al. | 455/435.3 |
| 2010/0103873 A1* | 4/2010 | Buracchini | 370/328 |
| 2010/0144351 A1* | 6/2010 | Witzel et al. | 455/435.2 |

FOREIGN PATENT DOCUMENTS

| | | |
|---|---|---|
| EP | 1718094 A | 11/2006 |
| WO | 0162034 A1 | 8/2001 |
| WO | 0176274 A | 10/2001 |
| WO | 20070112764 A | 10/2007 |

* cited by examiner

METHOD AND APPARATUS FOR DETECTING AN ALTERNATE WIRELESS COMMUNICATION NETWORK

FIELD OF THE INVENTION

The present invention relates generally to wireless communication devices and, more particularly, to a technique for detecting an alternate wireless communication network for the wireless communication device.

BACKGROUND

Wireless communication devices, for example mobile devices, often have the capabilities to operate in different types of geographic and radio access networks. Mobile devices often have a preferred network, service provider, and/or radio access technology (RAT). The preferred choice often depends upon the cost of the service, contractual terms between the user and the service provider, the mobile device's capabilities, the present location of the mobile device, and/or other priority factors.

When a mobile device is switched ON, it starts scanning for available networks. Also, when scanning for a network, the mobile device must determine whether a found network supports the particular radio access technology used by the mobile device. In existing systems, if the acquired network or RAT or service provider is not the first choice, the mobile device often continues to scan, in hopes of finding a higher, more preferred choice. Existing multi-mode mobile devices are battery powered and can consume a great deal of energy searching for alternate networks while still operating in a particular network. Such scanning by the mobile station uses additional energy of the battery of the mobile device and also consumes valuable processing time.

Nowadays, the increasing number of networks having different RATs plus the increasing number of multi-mode mobile devices results in a longer scanning and registration time period. First, the number of available networks of different RATs in a particular geographic area has increased. Second, the number of RATs a single mobile device can access has increased. Thus, the numbers of possible matching combinations have increased (e.g., matching the mobile devices capabilities with the available networks in a particular geographic area). After the matching combinations have been determined, they are ranked based on a variety of preference factors and, finally, the highest priority network is selected for registration.

Even after an initial network is acquired, the mobile device must account for the possibility that it may be on the edge of coverage for one particular network and should therefore be ready for a network handoff. Since initial acquisition on a new network is often a time consuming process, taking many seconds per failed attempt and often multiple seconds for successful attempts, the multi-mode mobile device continuously looks for alternate networks on several different channels and multiple RATs which also consumes a lot of battery power.

Accordingly, there is a need for new scanning methods that can reduce the amount of time and power it takes to acquire an alternate wireless communication network for the mobile device capable of operating in multiple modes.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A multi-mode wireless communication device uses a first radio access technology (RAT) when scanning for an initial wireless communication network and registers with the initial wireless communication using the first RAT. The wireless communication device then receives alternate RAT wireless communication network information from the initial wireless communication network using the first RAT. The device may select a network based on the alternate RAT wireless communication network information and scan for that network using the associated alternate radio access technology. By receiving alternate RAT wireless communication network information from the initial wireless communication network rather than during an initial scanning process, the multi-mode wireless communication device can quickly register on an initial wireless communication network and also quickly transfer to a more-preferred alternate wireless communication network.

Figure 1:
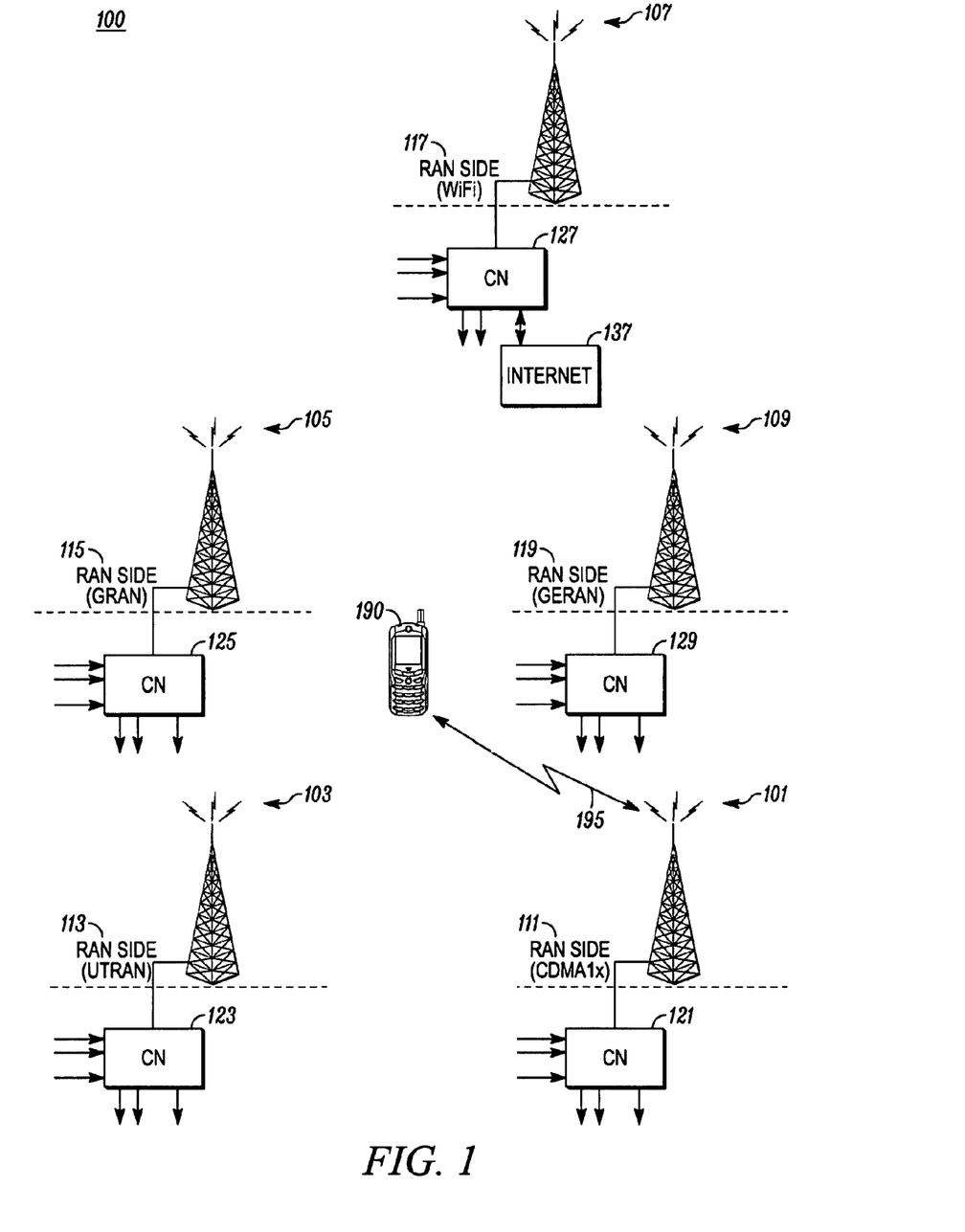
FIG. 1 is a system diagram with various wireless communication systems and a wireless communication device in accordance with some embodiments.

FIG. 1 is a system 100 diagram with various wireless communication systems and a wireless communication device in accordance with some embodiments. The system 100 shows various wireless communication systems 101, 103, 105, 107, and 109 using different radio access technologies.

A wireless communication system includes a radio access network (RAN) side coupled to a core network (CN). The RAN side generally has at least a base station controller coupled to base stations, which can be in communication with wireless communication devices. The RAN manages wireless communication links with the wireless communication devices using a particular radio access technology (RAT).

The core network (CN) generally includes a mobile switching network, a packet data network, and other network entities. The CN manages communication links to fixed networks and mobile networks. Examples of fixed networks include a public-switched telephone network, an integrated service digital network, and the Internet. In current wireless communication systems, the RANs and the CNs are configured such that one RAN is usually connected to one CN.

The wireless communication system 101 has a CN 121 and the RAN side 111. The CN 121 is a code division multiple access radio access (CDMA) network and the RAT employed in the wireless communication system 101 is CDMA 1x radio access technology. The arrows coming out and going in the CN 121 are used to connect the CN 121 to fixed networks, mobile networks, and other core networks.

Like the CDMA system 101, the wireless communication system 103 also has a CN 123 and the RAN side 113. The system 103, however, is universal mobile telecommunication system (UMTS). The CN 123 of UMTS shares many components with a Global System for Mobile Communication (GSM) core network (see below), and the RAT employed in the wireless communication system 103 is universal mobile telecommunication system (UMTS) radio access technology, which is usually based on wideband CDMA technology. The arrows coming out and going in the CN 123 are used to connect the CN 123 to fixed networks, mobile networks, and other core networks.

The wireless communication system 105 is a Global System for Mobile communications (GSM) system and has a Global system for mobile communications radio access network (GRAN) on its RAN side 115 and a GSM core network as its CN 125. The arrows coming out and going in the CN 125 are used to connect the CN 125 to fixed networks, mobile networks, and other core networks.

The wireless communication system 107 is a wireless local area system and has an IEEE 802.11 radio access technology on its RAN side 117 and a WiFi core network as its CN 127. The arrows coming out and going in the CN 127 are used to connect the CN 127 to fixed networks, for example, Internet 137, mobile networks, and other core networks.

The wireless communication system 109 is a GSM/EDGE system and has a GERAN radio access technology on its RAN side 119 and a GERAN network as its CN 129. The arrows coming out and going in the CN 129 are used to connect the CN 129 to fixed networks, mobile networks, and other core networks.

FIG. 1 may include additional or alternate existing and/or evolving wireless communication systems. For example, FIG. 1 may also (or alternately) include a Land Mobile Radio (LMR) system, which has a Land Mobile radio access technology on its RAN side and a LMR network as its CN. The LMR CN may be connected to fixed networks, mobile networks, and other types of core networks. In another variant, FIG. 1 may also include a WiMAX system. The WiMAX system has a multiple-input multiple-output scalable orthogonal frequency-division multiple access (MIMO SOFDMA) radio access technology on its RAN side and a WiMAX network as its CN. The WiMAX CN may also be connected to fixed networks, mobile networks, and other core networks. Also, an LTE (Long Term Evolution) network can be included in FIG. 1.

The system 100 also shows a multi-mode wireless communication device 190, sometimes referred to as user equipment (UE) when addressed in CDMA-based literature and a mobile station (MS) when addressed in GSM-based literature. The multi-mode wireless communication device 190 is equipped with the transceiver technology for using multiple RATs to interface with multiple wireless communication systems. The wireless communication device 190 can be representative of multiple wireless communication devices. In the example of FIG. 1, the multi-mode wireless communication device 190 is capable of CDMA 1x, GSM/EDGE, and WiFi wireless communication modes and is shown as connected to the CDMA radio access network (RAN 111) using CDMA 1x communications 195.

The multi-mode wireless communication device 190 has turned on and initially scanned using CMDA 1x radio access network 111 technology and registered on this initial network, CN 121. By scanning using only a CDMA 1x transceiver, the multi-mode wireless communication device 190 can quickly register with the system 101 among all the available systems 101, 103, 105, 107, 109 within the geographic range of the device 190. This CDMA system 101, however, may not be the most preferred network available. For example, the WiFi system 107 is in close proximity and may be available at a lower cost. Or the GSM/EDGE system 109 may be available and be a home network for the device. After the device is registered with an initial network, the initial network sends alternate wireless communication network information to the device so that the device can switch to a more preferred network, if available.

Figure 2:
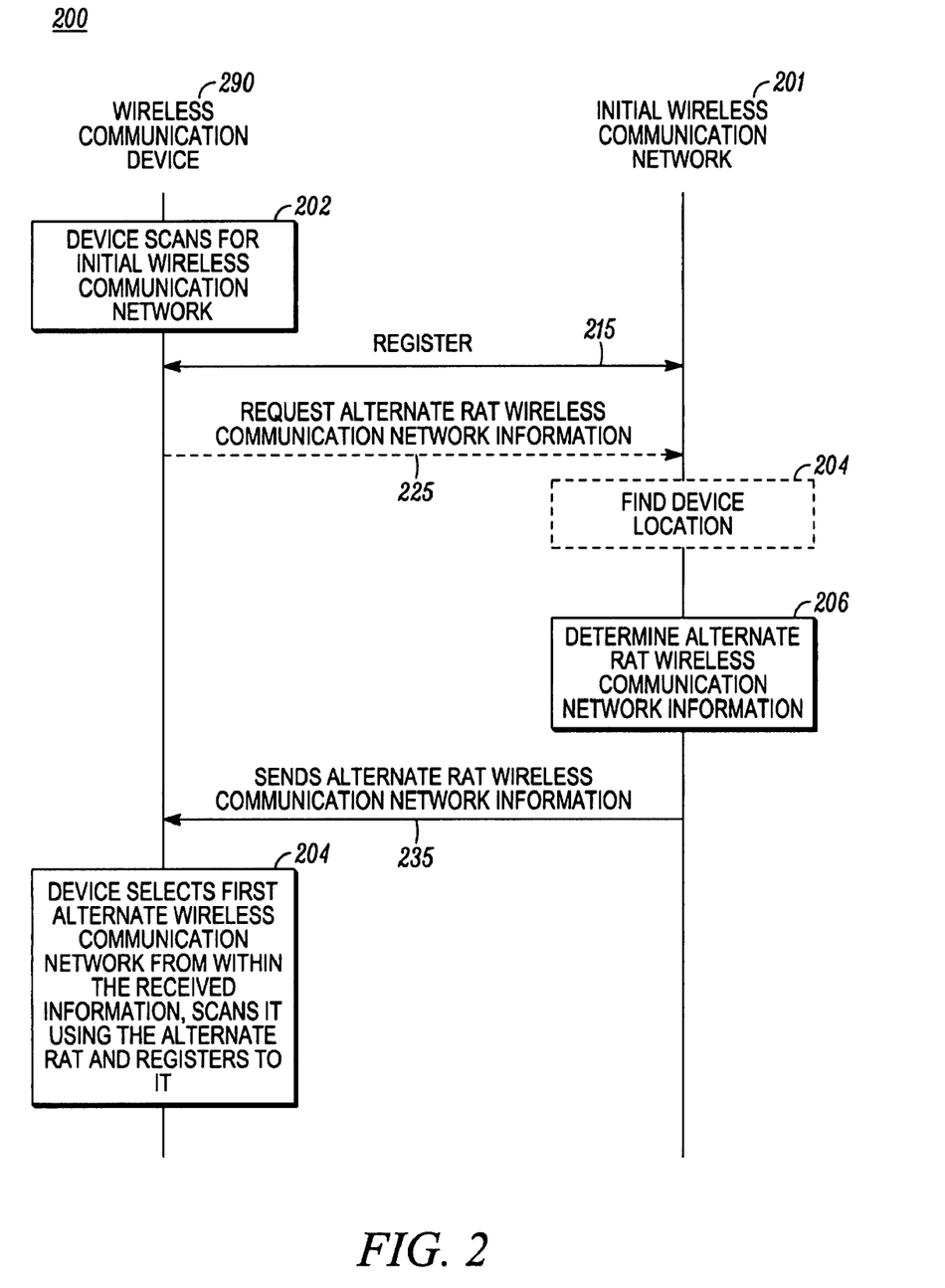
FIG. 2 is a sample signal flow diagram of a method of selecting an alternate wireless communication system for a wireless communication device in accordance with some embodiments.

FIG. 2 is a sample signal flow diagram 200 between a multi-mode wireless communication device 290 and an initial wireless communication network 201 for a method for selecting an alternate wireless communication system in accordance with some embodiments. The vertical line from the wireless communication device 290 represents signaling to and from the wireless communication device 290. The vertical line from the initial wireless communication network 201 represents signaling to and from the initial wireless communication network 201.

Initially, when the multi-mode wireless communication device 290 is switched ON, it scans 202 for an initial wireless communication network using its one or more transceivers. This initial scanning can use less than all of its capabilities in order to reduce the amount of time needed to find a suitable network. For example, the device 290 has CDMA, GSM/EDGE, and WiFi transceiver technology. During initial scanning, however, it uses only the RAT last used by the device— which is CDMA in this situation. When the device 290 finds the initial wireless communication network using the first RAT, the device 290 registers 215 to the initial wireless communication network 201, even though that network may be weak or may not be a preferred system.

After registering, the device 290 may send a request 225 for alternate RAT wireless communication network information to the initial wireless communication network 201. The request may include radio access capabilities of the multi-mode device, the preference level of the initial network (e.g., roam, preferred, home, etc.), the approximate location of the device (as determined at the device), and other network preference and priority factors. In lieu of an explicit request signal 225, the initial registration 215 may automatically trigger a request for alternate RAT wireless communication network information within the initial wireless communication network 201. If the initial network is aware of information specific to the device (e.g., the radio access capabilities, the preference level of the network at the device, the location of the device, etc.) it can be included in the automatic request.

The alternate RAT wireless communication network information requested may provide a list of alternate wireless communication networks and different RATs for the multi-mode wireless communication device. This information may be in the form of a frequency band, a channel set, a channel assignment, a channel allocation, signaling codes, security codes, system identifiers, system timing of alternate RATs relative to the first RAT, or a timing error of alternate RATs.

After receiving an explicit or implicit request that does not include the approximate geographic location of the device, the initial wireless communication network 201 may find 204 the present location of the device using location techniques known in the art.

Subsequently, the initial wireless communication network 201 determines 206 alternate RAT wireless communication network information for the device 290. This alternate RAT wireless communication network information determined by the initial network 201 may be selected depending on one or more of the following factors, which may be provided by the device or determined by the initial network: the priority factors for network selection at the device, the present location of the device, the requested or anticipated services, non-RAT capabilities of the device, signal strength, RAT capabilities of the device, lowest transmit power, or any other factor that can be used by the initial wireless communication network to determine alternate RAT wireless communication network information for the device. Priorities may also be affected by lowest cost, lowest cost per bit (data), highest data rate, etc.

After determining the appropriate information to include, the initial wireless communication network sends 235 the alternate RAT wireless communication network information to the device 290. In one example, the initial wireless communication network may send the alternate RAT information to multiple wireless communication devices either through individual addressing, group addressing, or a broadcast.

If the alternate RAT wireless communication network information includes a list of alternate networks and different RATs, the device 290 selects 240 a first alternate wireless communication network from within the received alternate RAT wireless communication network information based on prioritization factors known by the device 290. After selecting the first alternate wireless communication network, the device 290 scans for the first alternate wireless communication network using the alternate RAT associated with the first alternate wireless communication network. As a result of scanning, if the device 290 finds the first alternate wireless communication network, the device 290 registers to the first alternate wireless communication network. If the scanning is unsuccessful, which would be unusual if the device is stationary, then the next-highest priority alternate wireless communication network and associated RAT is selected for scanning. If the alternate RAT wireless communication network information represents only one alternate network and corresponding RAT, the device 290 may scan for it and register to it without any need for selection among options within the list.

Figure 3:
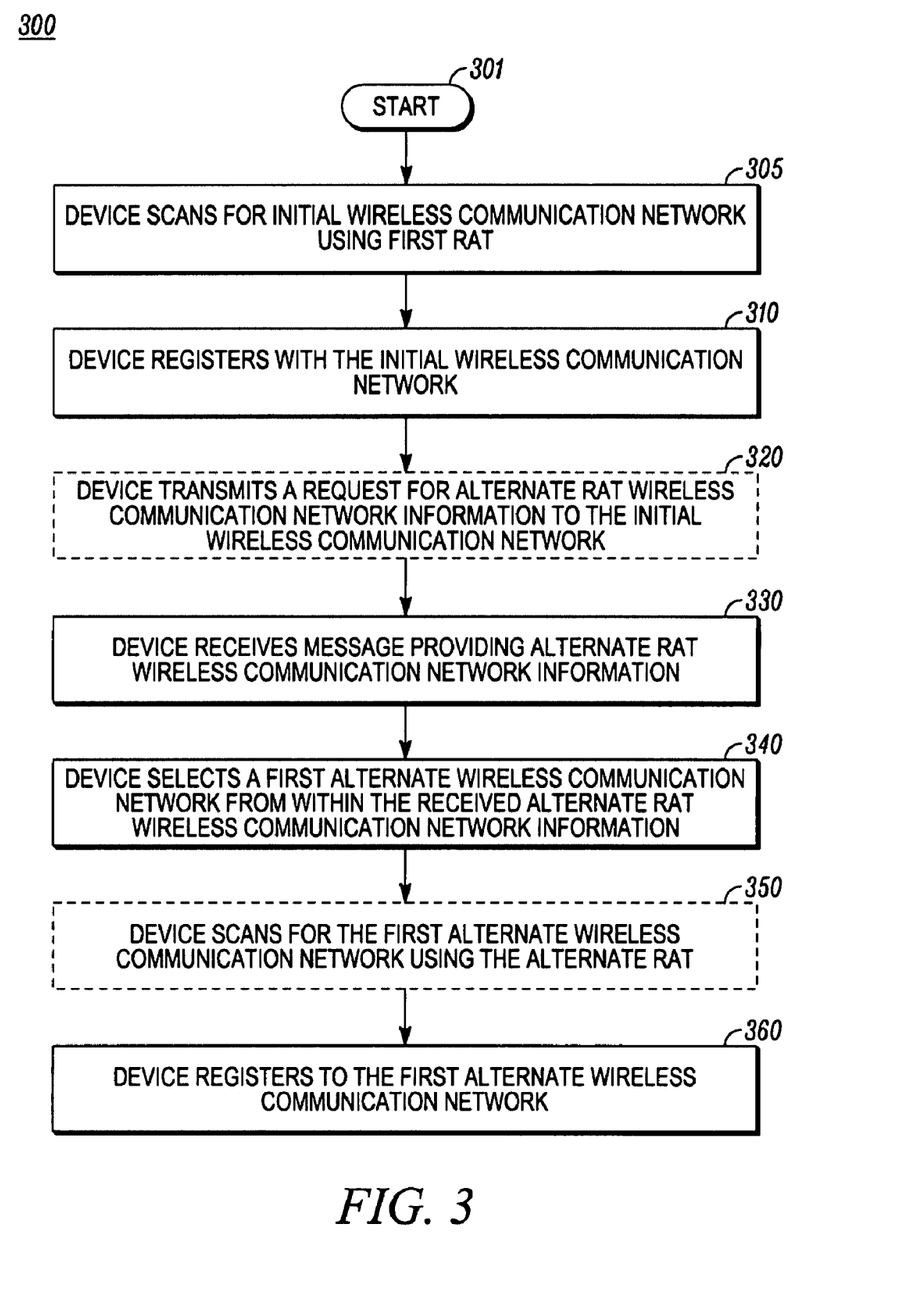
FIG. 3 is a flowchart of a method for a wireless communication device to select an alternate wireless communication system in accordance with some embodiments.

FIG. 3 is a flowchart of a method for a wireless communication device to select an alternate wireless communication system in accordance with some embodiments. We shall use as an example the multi-mode wireless communication device 190 in FIG. 1, which has just been switched ON and registered with the CDMA system 101. In this example, the device 190 was connected to a CDMA network (not necessarily CDMA system 101) before it was switched OFF. In this embodiment, the device 190 will scan using its CDMA transceiver when next turned ON, because this embodiment uses the most recently-used RAT for initial scanning to save time and energy. Alternate turn-on transceivers may be selected based on a preferred radio access technology or for other reasons.

After the device 190 is turned ON, the method 300 starts in step 305 when the device 190 scans for an initial wireless communication network using a transceiver using the first RAT (CDMA 1x). As a result, the device 190 finds the initial wireless communication system 101 and in step 310 the device 190 registers with the initial wireless communication system 101, even though that network may have a weak signal or have a low priority (e.g., "roam" or "preferred" instead of "home").

In one embodiment, the registration process of the wireless communication device 190 with the initial wireless communication network includes an automatic (or implicit) request for alternate RAT wireless communication network information from the initial wireless communication network. In another embodiment, after registering, the device 190 transmits an explicit request for alternate RAT wireless communication network information to the initial wireless communication system 101 in step 320. Along with the explicit request, the device 190 may also transmit one or more priority factors. Instead of (or in addition to) transmitting priority factors, while registering, the device 190 may transmit its unique identity to the initial wireless communication system 101, and this unique identity may be associated with priority factors stored at the initial wireless communication system 101. Along with the explicit request, the device 190 may also transmit its present location to the initial wireless communication system 101. In one example, the requesting may be performed by using short messaging service (SMS).

In step 330, the device 190 receives a message with alternate RAT wireless communication network information. The alternate RAT wireless communication network information can be based at least on a priority factor, or on a present location of the device 190, or both. The alternate RAT wireless communication network information includes a list of alternate wireless communication networks and different RATs (CDMA, GSM, EDGE, WiFi, LMR, etc.), for the multi-mode wireless communication device. This information may be in the form of a frequency band, a channel set, a channel assignment, a channel allocation, signaling codes, security codes, system identifiers, system timing of alternate RATs relative to the initial RAT, or a timing error of alternate RATs.

If the first RAT is one of GRAN, GERAN, CDMA 1x, UTRAN, or any other wireless RAT, then receiving the alternate RAT wireless communication network information may use packet data signaling or a short messaging service (SMS). In another example, if the initial RAT is UTRAN then receiving the alternate RAT wireless communication network information may use a multimedia broadcast multicast service (MBMS). If the initial RAT is CDMA 1x then receiving the alternate RAT wireless communication network information may use broadcast/multicast service (BCMCS). In yet another example, if the initial RAT is 802.11 (WiFi) then receiving the alternate RAT wireless communication network information may use service set identifier (SSID). If the initial RAT is LMR then receiving the alternate RAT wireless communication network information may use outbound signaling words (OSW) over a control channel or traffic channel. If the initial RAT is a packet data network then receiving the alternate RAT wireless communication network information may use data packets. In the example of FIG. 1, receiving the alternate RAT wireless communication network information uses BCMCS because the first RAT is CDMA 1x.

The alternate RAT wireless communication network information may have only one best alternate wireless communication network based on the priority factor and/or present location of the wireless communication device as known by the initial wireless communication network. In this case, the selection is easy and the device 190 select the best alternate wireless communication network provided in the alternate RAT wireless communication network information. In another example, the alternate RAT wireless communication network information has no alternate wireless communication network, if there is no alternate wireless communication network of a higher priority than the initial wireless communication network based on the priority factor and/or present location of the device as known by the initial wireless communication network. In yet another example, the alternate RAT wireless communication network information comprises a list of multiple alternate wireless communication networks based on the priority factor and/or present location of the device as known by the initial wireless communication network.

If the alternate RAT wireless communication network information includes a list of multiple alternate wireless communication networks, then the device 190 selects a first alternate wireless communication network from within the received alternate RAT wireless communication network information in step 340 based on its priority factors. (These priority factors may or may not have been transmitted to the initial wireless communication network.)

After selecting a first alternate wireless communication network to try, the device 190 scans for the first alternate wireless communication network using the alternate RAT in step 350. As a result of scanning, if the device 190 finds the first alternate wireless communication network, the device 190 registers to the first alternate wireless communication network in step 360. Otherwise, the device 190 keeps on repeating the selection and scanning process. That is, the device 190 selects a second alternate wireless communication network from within the received alternate RAT wireless communication network information, scans for the second alternate wireless communication network using the associated alternate RAT, and registers to it if successful. In a case when the alternate RAT wireless communication network information includes a channel assignment, then the device 190 skips step 350. In this scenario, the device 190 does not scan for the first alternate wireless communication network, but directly registers to it, using the channel assignment information provide in the alternate RAT wireless communication network information.

In the example of FIG. 1, for instance, the device 190 registers to CN 121 and transmits a request for alternate RAT wireless communication network information. Along with the request, the device 190 also transmits its present location as well as a priority factor. In this example, the priority factor is the RAT capabilities of the device 190, and it specifies that the device 190 is capable of handling GRAN, GERAN, and WiFi radio access technologies as well as CDMA 1x. In response to the request, the device 190 receives alternate RAT wireless communication network information. In this example, the alternate RAT wireless communication network information includes frequency channels (and other information like a channel set, a channel assignment, a channel allocation, signaling codes, security codes, system identifiers, system timing of alternate RATs relative to the initial RAT, or a timing error of alternate RATs) for GRAN 115, GERAN 119, and WiFi 117 systems. The device 190 selects the first alternate wireless communication network CN 129 from within the received alternate RAT wireless communication network information based on another priority factor (e.g., that its most-preferred "home" network is a GERAN network) and scans for system 109 using its GERAN transceiver (and the other information provided such as frequency and maybe some codes or a channel set, a channel assignment, a channel allocation, signaling codes, security codes, system identifiers, system timing of alternate RATs relative to the initial RAT, a timing error of alternate RATs, etc.). Assuming the device 190 finds the system 109, the device 190 registers to it.

By scanning using only a subset of transceivers available to a multi-mode device, it can quickly find and register on an initial network. This network may not be the most ideal for communication with the device, but the device can receive alternate information from the initial network. Based on priority factors known to the initial network or the device, the device can select a first alternate network with a higher priority than the initial network. By scanning using the alternate network information and registering on an alternate network, the device may save battery power, reduce processing time, and improve user experience compared with scanning all available networks using all available transceivers.

In an example where the aforementioned method can be used, a mobile station can quickly find and register to a wide area network (for example, GSM, UMTS), rather than local area or metropolitan area network (for example, WiFi, WiMAX, LTE). This wide area network may not be the most ideal network for the communication device, but is more easily reached due to its larger footprint. Then the wide area network can provide information about local area or metropolitan area networks that are more appropriate for the communication device but were not easily reachable due to their smaller footprints. Then, the mobile station can switch to a local area or metropolitan area network without having to scan for it separately. This particular implementation may be very useful for network operators that have both wide area networks and local area or metropolitan area networks, because the network operator can use this technique to more easily load-balance among different types of networks.

Figure 4:
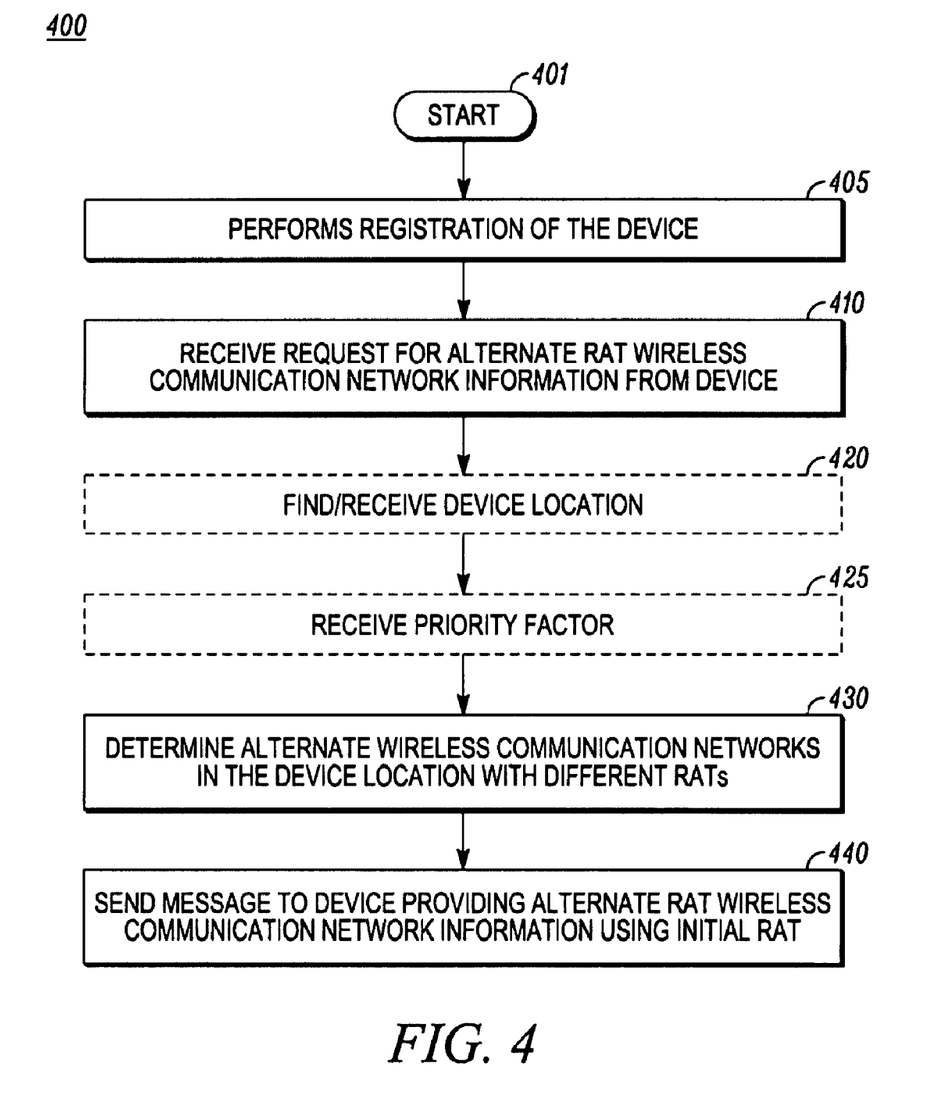
FIG. 4 is a flowchart of a method for a wireless communication network to assist a wireless communication device in selecting an alternate wireless communication system in accordance with some embodiments.

FIG. 4 is a flowchart of a method for a wireless communication network to assist a wireless communication device in selecting an alternate wireless communication system in accordance with some embodiments. This flowchart is a counterpart to the FIG. 3 flowchart. The flowchart of FIG. 3 is from the device's point of view while the flowchart of FIG. 4 is from the initial wireless communication network's point of view.

The method 400 starts with the step 405 when the initial wireless communication network performs the registration of the device using the first RAT. In one embodiment, the registration process of the wireless communication device 190 with the initial wireless communication network includes an automatic (or implicit) request to the initial wireless communication network for alternate RAT wireless communication network information. In another embodiment, the initial wireless communication network may receive an explicit request for alternate RAT wireless communication network information in step 410. Along with the explicit or implicit request, the initial wireless communication network may receive the device's present location or may find the device's present location in step 420. The initial wireless communication network may also receive one or more priority factors in step 425, along with the request or by looking up priority factors associated with the device when it registers.

In step 430, the initial wireless communication network determines the alternate wireless communication networks with associated RATs for the wireless communication device. These alternate wireless communication networks with associated RATs are included in the alternate RAT wireless communication network information. This information may include a frequency band, a channel set, a channel assignment, a channel allocation, signaling codes, security codes, system identifiers, system timing of alternate RATs relative to the initial RAT, or a timing error of alternate RATs etc. This alternate RAT wireless communication network information can be based on the priority factor, the present location of the device, or both (and other factors mentioned earlier such as device capabilities, home-preferred-roam, etc.). After determining the context of the list, the initial wireless communication network sends a message to the wireless communication device providing alternate RAT wireless communication network information using the first RAT in step 440.

Thus, the network provides information to the device so that the device does not have to scan for those alternate RATs. If there are no alternate RATs, the list can be empty. If there is only one alternate RAT that is acceptable according to the priority information known to the network, then the list will only include one alternate RAT's information. If there are multiple alternate RATs that may be acceptable to the device, then the list may include a number of alternate RATs and let the device select a first alternate RAT to scan first.

Figure 5:
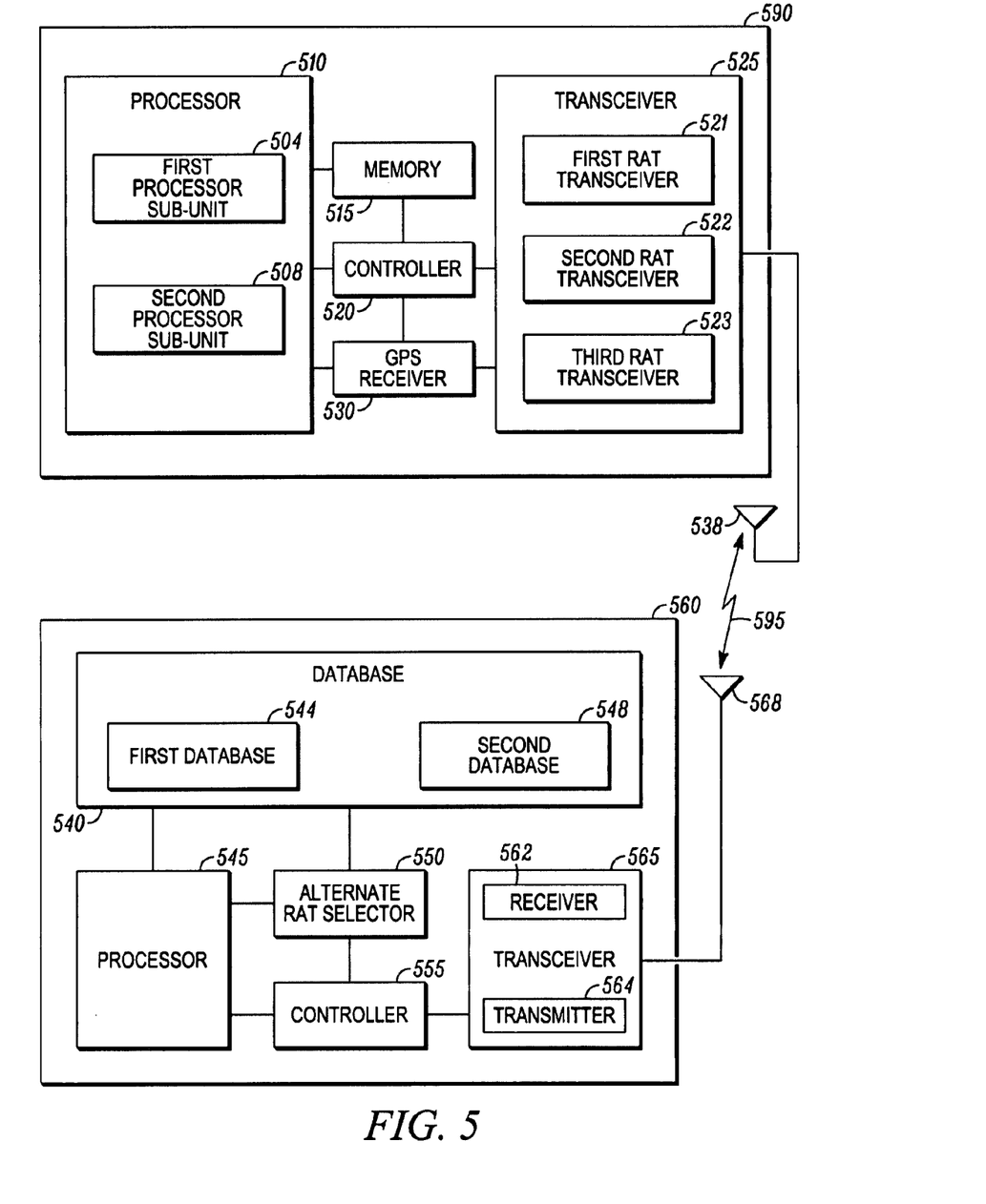
FIG. 5 is a block diagram of a wireless communication device in communication with an initial wireless communication network in accordance with some embodiments.

FIG. 5 is a block diagram 500 of a multi-mode wireless communication device 590 connected to an initial wireless communication network 560 in accordance with some embodiments. The block diagram 500 includes a wireless communication device 590, sometimes referred to as user equipment (UE) in CDMA literature and a mobile station (MS) in GSM literature. The device 590 is in communication with an initial wireless communication network 560 using a first radio access technology 595. The device 590 has a processor 510, memory 515, controller 520, transceivers 525, a GPS (Global Positioning System) receiver 530, and an antenna 538.

The antenna 538 is responsible for the transmission and reception of signals to and from the device 590. The antenna is connected to the transceiver 525. The transceiver 525 is used for transmitting and receiving signals to and from the antenna 538. Because the device is a multi-mode device, the transceiver 525 is a composite transceiver capable of operating using one of several different RATs. The transceiver 525 has a first RAT transceiver 521 that operates using CDMA 1x protocols, a second RAT transceiver 522 that operates using GSM/EDGE protocols, and a third RAT transceiver 523 that operates using WiFi protocols. The second RAT transceiver 522 and the third RAT transceiver 523 are considered alternate RAT transceivers at this time, because the CDMA 1x transceiver 521 is currently in operation. There can be more alternate RAT transceiver depending upon the RAT capabilities of the device. The alternate RAT transceiver may change depending on the priority in the device. While FIG. 5 shows a single antenna for all the individual transceivers, it is possible to replace the single antenna with a separate antenna for each transceiver, or for two or more transceivers to share an antenna.

In accordance with the examples used previously, a device turns ON and scans using the transceiver used prior to the device being turned OFF. If the previously-used transceiver was a CDMA transceiver, the device scans for CDMA networks and registers on a best-available CDMA network 560 without regard for other networks available that use different RATs. (See FIG. 1) After the device is registered on the CDMA network 560, it transmits a request to the initial wireless communication network 560 for alternate RAT wireless communication network information using the first RAT (CDMA 1x). The first RAT transceiver 521 receives a message containing the alternate RAT wireless communication network information using the first RAT (CDMA 1x). The device selects a network from the information and an alternate RAT transceiver 522 or 523 scans for the alternate wireless communication network using the alternate RAT. The selection of the alternate transceiver to be used depends on the alternate RAT that is selected. In this example, if the alternate RAT is IEEE 802.11, then the third RAT transceiver 523 is used. And if the alternate RAT is GERAN, then the second RAT transceiver 522 is used.

The transceiver 525 is coupled to the GPS receiver 530. The GPS receiver 530 is also coupled to the processor 510 and the controller 520. The GPS receiver 530 is used by the device 590 to determine its own present location. Although a GPS receiver is used here as an example, other positioning or location technologies can be substituted. This present location is sent to the initial wireless communication network 560 with the request for alternate RAT wireless communication network information, in this embodiment.

The transceiver 525 is also coupled to the controller 520. The controller is coupled to the memory 515 that stores the priority factors. The memory 515 and the controller 520 are coupled to the processor 510. The processor 510 includes a first processor sub-unit 504 and a second processor sub-unit 508. The first processor sub-unit 504 selects an alternate RAT wireless communication network based on the priority factor (s) stored in the memory 515. The second processor sub-unit extracts the alternate RAT wireless communication network information from the message received by the first RAT transceiver 521. Depending on the technology of the first RAT, the message may be a short messaging service (SMS) message, a multimedia broadcast multicast service (MBMS) message, a broadcast/multicast service (BCMCS) message, a service set identifier (SSID) message, outbound signaling words, data packets, or the like.

The initial wireless communication network 560 includes a processor 545, a database 540, an alternate RAT selector 550, a controller 555, a transceiver 565, and an antenna 568. The processor 545 is coupled to the database 540. The database 540 has a first database 544 for storing information about other wireless communication networks in the vicinity and a second database 548 that is optional. The second database 548 stores priority factors, if any, for one or more wireless communication devices. In this example, the second database stores RAT capabilities of the wireless communication devices. The database 540 is coupled to the alternate RAT selector 550, which is also coupled to the processor 545 as well as the controller 555. The alternate RAT selector 550 selects the alternate RAT wireless communication network information from the first database 544 to send to the device 590.

In one example, the alternate RAT selector 550 may select the alternate RAT wireless communication network information based on a present location of the device 590. The present location of the device 590 can either be transmitted by the device 590 (determined using a GPS receiver 530, for example) to the initial wireless communication network 560 or it can be found by the initial wireless communication network 560 using known techniques. In another example, the alternate RAT selector 550 may select the alternate RAT wireless communication network information based on RAT capabilities of the device 590 stored in the second database 548. In yet another example, the alternate RAT selector 550 may select the alternate RAT wireless communication network information based on another priority factor transmitted by the device 590 to the initial wireless communication network 560 such as a list of preferred networks. The alternate RAT selector 550 may also select the alternate RAT wireless communication network information based multiple priority factors, such as the device's transceivers plus the present location of the device 590.

The alternate RAT selector 550 sends the alternate RAT wireless communication network information to the transceiver 565 to transmit to the device 590. The transceiver includes a receiver 562 and a transmitter 564. The transmitter 564 uses the first RAT to transmit the alternate RAT wireless communication network information to the device 590. The receiver 562 uses the first RAT to receive all the messages, requests, etc. from device 590. The transceiver 565 is coupled to the antenna 568 that is responsible for reception and transmission of signals.

We shall use, as an example, the device 190 in FIG. 1 as an instance of the device 590 in FIG. 5, which has just been switched ON. For instance, the device 190 was connected to the CDMA radio access network 111 before it was switched OFF. This information is stored in the device 190. Then, in this embodiment, CDMA 1x radio access technology is the first RAT for the device 190 and will be activated upon turn ON of the device. After the device 590 is turned ON, the device 590 uses the first RAT (CDMA) transceiver 521 to scan for a CDMA system 101 using its first RAT (CDMA 1x). As a result, the device 590 finds RAN 111 and registers with the initial wireless communication system 101 regardless of signal strength or network priority. The device 590 uses the first RAT transceiver 521 to transmit a request for alternate RAT wireless communication network information, after registering to CDMA system 101. Along with the request, in this embodiment, the device 590 also transmits its present location as determined using its GPS receiver 530.

The initial wireless communication network 560 (CDMA system 101) receives the request via its receiver 562. In response to the request, the initial wireless communication network 560 uses the alternate RAT selector 550 to select appropriate alternate RAT wireless communication network information from the first database 544 to send to the device 590. The alternate RAT selector 550 selects the appropriate alternate RAT wireless communication network information based on the RAT capabilities of the device 590 and the location reported by the device 590. The RAT capabilities of the device 590 are retrieved from the second database 548 by using the unique identifier transmitted by the device 590 to the network 560 during registration. In this example, the RAT capabilities of the device 590 are GRAN, GERAN, and WiFi. The transmitter 564 transmits the selected alternate RAT wireless communication network information to the device 590 using the first RAT (CDMA 1x) in a BCMCS message in this example.

In this example, the alternate RAT selector 550 with the help of the processor 545 and the controller 555 selects the alternate RAT wireless communication network information based on a present location of the device 590 sent by the device 590 in the request as well as the RAT capabilities of the device 590. The alternate RAT wireless communication network information may also be based on another priority factor transmitted by the device 590 to the initial wireless communication network 560 such as a list of preferred networks. The alternate RAT selector 550 may also select the alternate RAT wireless communication network information based on any number of combinations of priority factors known to the alternate RAT selector 550.

The device 590 receives alternate RAT wireless communication network information via the first RAT transceiver 521. In this example, the alternate RAT wireless communication network information includes GERAN RAT information for GERAN system 109 and WiFi RAT information for WiFi system 107. The device 590 uses the second processor subunit to extract the alternate RAT wireless communication network information from the BCMCS message received by the first RAT transceiver 521. The device 590 selects the first alternate RAN from within the received alternate RAT wireless communication network information and uses the alternate RAT transceiver that can be the second RAT transceiver 522 or the third RAT transceiver 523 for scanning the frequency indicated in the information. Selecting the second RAT transceiver 522 or the third RAT transceiver 523 for scanning the frequency indicated in the information depends upon the alternate RAT used. In this example, the second RAT transceiver 522 operates using GSM/EDGE protocols, and the third RAT transceiver 523 operates using WiFi protocols. If the alternate RAT selected for scanning is IEEE 802.11, then the third RAT transceiver 523 is used and if the alternate RAT selected for scanning is GERAN, then the second RAT transceiver 522 is used. As a result of scanning the device 190 finds an alternate RAN, and registers to its associated network.

The initial wireless communication network provides information to the device so that the device does not have to scan for alternate RATs. If there are no alternate RATs, the list can be empty. If there is only one alternate RAT that is acceptable according to the priority information known to the network, then the list will only include one alternate RAT's information. If there are multiple alternate RATs that will be acceptable to the device, then the list may include a number of alternate RATs and let the device select a first alternate RAT to scan first. Thus, the aforementioned method will reduce the amount of time and power it takes to scan and acquire an alternate wireless communication network for the wireless communication device.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The above description and the diagrams do not illustrate do not necessarily require the order illustrated.

It will be appreciated that embodiments of the invention described herein may be comprised of one or more conventional processors and unique stored program instructions that control the one or more processors to implement, in conjunction with certain non-processor circuits, some, most, or all of the functions of described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selecting an alternate wireless communication system for a wireless communication device comprising:
    using a first radio access technology (RAT) when scanning for an initial wireless communication network;
    registering the wireless communication device with the initial wireless communication network using the first RAT;
    receiving alternate RAT wireless communication network information for a plurality of alternate RATs from the initial wireless communication network using the first RAT, wherein the initial wireless communication network determines the alternate RAT wireless communication network information based on a first priority factor including RAT capabilities of the wireless communication device; and
    selecting a first alternate wireless communication network based on a second priority factor for network selection at the wireless communication device, wherein the second priority factor is based at least on signal strength, transmit power, requested services, or anticipated services.

2. The method of claim 1 further comprising:
    scanning for the first alternate wireless communication network using an alternate RAT;
    registering the wireless communication device with the first alternate wireless communication network using the alternate RAT.

3. The method of claim 1, wherein the second priority factor is based at least on signal strength.

4. The method of claim 1 further comprising:
    sending the first priority factor to the initial wireless communication network.

5. The method of claim 4, wherein the alternate RAT wireless communication network information has no alternate wireless communication network, if there is no alternate wireless communication network better than the initial wireless communication network based on the first priority factor.

6. The method of claim 1, wherein the first priority factor is based upon a present location of the wireless communication device.

7. The method of claim 6 further comprising:
    transmitting the present location of the wireless communication device to the initial wireless communication network.

8. The method of claim 6, wherein the initial wireless communication network finds the present location of the wireless communication device.

9. The method of claim 1 further comprising:
    requesting the alternate RAT wireless communication network information from the initial wireless communication network using the first RAT, before receiving.

10. The method of claim 9, wherein requesting is performed using short messaging service (SMS).

11. The method of claim 9, wherein requesting "automatically" occurs upon registering.

12. The method of claim 1, wherein receiving the alternate RAT wireless communication network information uses packet data signaling.

13. The method of claim 1, wherein receiving the alternate RAT wireless communication network information uses a short messaging service (SMS) and wherein the first RAT is Global System for Mobile Communications (GSM) radio access technology.

14. The method of claim 1, wherein receiving the alternate RAT wireless communication network information uses a multimedia broadcast multicast service (MBMS) and wherein the first RAT is Universal Mobile Telecommunications System UMTS radio access technology.

15. The method of claim 1, wherein receiving the alternate RAT wireless communication network information uses a broadcast/multicast service (BCMCS) and wherein the first RAT is Code Division Multiple Access (CDMA) 1x radio access technology.

16. The method of claim 1, wherein receiving the alternate RAT wireless communication network information uses a Service Set Identifier (SSID) and wherein the first RAT is IEEE 802.11 radio access technology (WiFi).

17. The method of claim 1, wherein receiving the alternate RAT wireless communication network information uses outbound signaling words (OSW) conveyed over a control channel or over a traffic channel and wherein the first RAT is Land Mobile Radio access technology (LMR).

18. The method of claim 1, wherein the alternate RAT wireless communication network information comprises at least a frequency band, a channel set, a channel assignment, a channel allocation, signaling codes, security codes, system identifiers, a system timing of alternate RATs relative to the first RAT, or a timing error of alternate RATs.

19. The method of claim 1 wherein the second priority factor is based on requested services at the wireless communication device.

20. The method of claim 1 wherein the second priority factor is based on anticipated services at the wireless communication device.

21. The method of claim 1 wherein the second priority factor is based on a location of the wireless communication device.

22. The method of claim 1 wherein the second priority factor is based on a transmit power of the wireless communication device.

23. The method of claim 1 wherein the second priority factor is based on a cost per bit of data at wireless communication device.

* * * * *